United States Patent
Goeppert et al.

(10) Patent No.: US 10,338,908 B2
(45) Date of Patent: Jul. 2, 2019

(54) MODULARIZED APPLICATION FRAMEWORK

(71) Applicant: SAP SE, Walldorf (DE)

(72) Inventors: Jörg Goeppert, Karlsruhe (DE); Niels Hebling, Walldorf (DE); Klaus Herter, Leimen (DE); Hergen Siefken, Walldorf (DE)

(73) Assignee: SAP SE, Walldorf (DE)

( * ) Notice: Subject to any disclaimer, the term of this patent is extended or adjusted under 35 U.S.C. 154(b) by 134 days.

(21) Appl. No.: 15/404,050

(22) Filed: Jan. 11, 2017

(65) Prior Publication Data
US 2018/0196664 A1 Jul. 12, 2018

(51) Int. Cl.
*G06F 8/60* (2018.01)
*G06F 8/65* (2018.01)
*G06F 9/445* (2018.01)

(52) U.S. Cl.
CPC .............. *G06F 8/65* (2013.01); *G06F 8/60* (2013.01); *G06F 9/44526* (2013.01)

(58) Field of Classification Search
CPC .......... G06F 8/65; G06F 8/60; G06F 9/44526
See application file for complete search history.

(56) References Cited

U.S. PATENT DOCUMENTS

| | | | | |
|---|---|---|---|---|
| 7,669,197 B1* | 2/2010 | O'Neill | ................ | G06F 8/658 717/172 |
| 9,098,315 B1* | 8/2015 | Kapoor | ................ | G06F 9/541 |
| 2003/0018951 A1* | 1/2003 | Srivastava | ............ | G06F 8/20 717/101 |
| 2004/0107237 A1* | 6/2004 | Kashiwada | ............ | G06F 8/65 709/200 |
| 2012/0304164 A1* | 11/2012 | van der Zweep | ... | G06F 9/44505 717/174 |
| 2016/0065626 A1* | 3/2016 | Jain | ................. | G06F 17/30873 709/205 |
| 2017/0302725 A1* | 10/2017 | Carr | ..................... | H04L 67/02 |

* cited by examiner

*Primary Examiner* — Viva Miller
(74) *Attorney, Agent, or Firm* — Sterne, Kessler, Goldstein & Fox P.L.L.C.

(57) ABSTRACT

Disclosed herein are system, method, and computer program product embodiments for a modularized application framework. The embodiments disclosed herein may be used in enterprise software and development platforms to quickly deploy new applications and updates, using a decoupled modular configuration executed by a core framework. An embodiment operates by loading a first and second module into a framework. Information and/or services may be transferred from the first module to the second module or vice versa using the framework. Then, the first or second module is unloaded from the framework while the other module remains functional.

20 Claims, 9 Drawing Sheets

MODULARIZED APPLICATION FRAMEWORK

BACKGROUND

As companies grow and evolve, the type of company data that must be managed becomes more complex. To manage this data, some companies have turned to customized software, specific to the needs of the company. Further, some companies have begun to develop their own software or applications as some commercial software may not be able to effectively meet the company's specific needs. Often, these companies use development platforms to aid in the development of new software.

The development of new software using these platforms, however, often creates a development burden when attempting to develop updates or improvements. Adding a new feature to the existing software often requires editing the core software, which lengthens development time for only incremental changes. Further, the changes may affect existing functions, leading to new problems during development. Extensive testing may also be required to ensure that the new update is capable of operating error-free. Testing often requires that users surrender software service during the testing period. For a company to pursue such update testing, users or employees of the existing software may be unable to access the software for extended periods of time. Without an effective method of developing new software and deploying new updates, much time is wasted during development and much frustration is generated by users unable to utilize the existing software.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a modularized application framework. In an embodiment, a modularized framework allows for the development of software updates or new software applications in the form of modules. The modules may then be implemented and distributed to users using a core framework. The core framework remains the same while software updates or new applications are tested as modules. By using a declarative approach, modules may exist separately from the framework. This approach allows for the development of new software without requiring core changes to the existing software. Further, modules may be developed remotely and stored in a cloud for ease of distribution to users.

This modular configuration also allows for new features to be selectively activated and deactivated. In an embodiment, the new features may be tested with a first fixed or predefined number of users. That is, not all user need to experience every update. This method of testing is useful if a particular user will not use the new feature or does not have permission to use the new feature. By only activating new features for certain users, only a few users may be burdened during testing without the need to affect every user of the existing software. Further, multiple versions of a module may be activated simultaneously, allowing for testing of new versions while still providing old versions.

Regarding user access, a graphical user interface may also utilize a modular approach corresponding to the underlying software. The graphical user interface may utilize a core layout while presenting decoupled modules as updates or separate applications. Decoupling the modules allows a user to continue to view a core layout while adding optional modules. Users are thus able to become familiar with a core layout, potentially spanning across various computing devices, and quickly determine if the new module is useful. If the user determines that the new module is not useful or relevant, the core layout of the software remains the same and the user can continue to use the existing software without any additional burden.

To implement this modularized application framework, key components may be utilized. These components may include modules, eventing, layouting, services, and configurations. Metadata may be passed among these components, as well as the core framework, to allow decoupling of the modules while still maintain functionality. This approach allows for easily applicable global design guidelines as well as flexibility in module development. This implementation also allows for shipping of smaller fixes or features in less time, satisfying customer needs more quickly.

Figure 1:
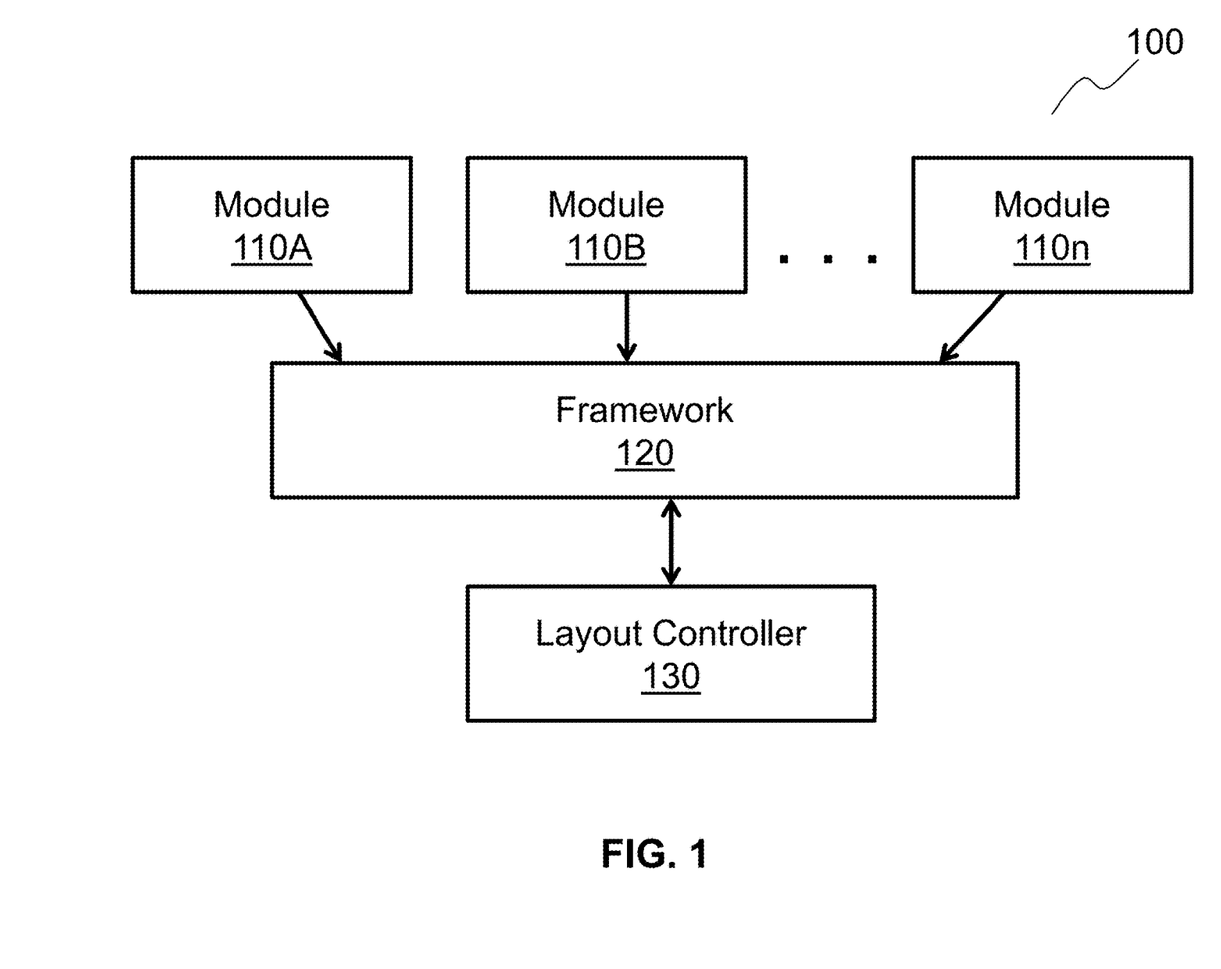
FIG. 1 is a block diagram of a modularized application framework system, according to some embodiments.
Figure 6:
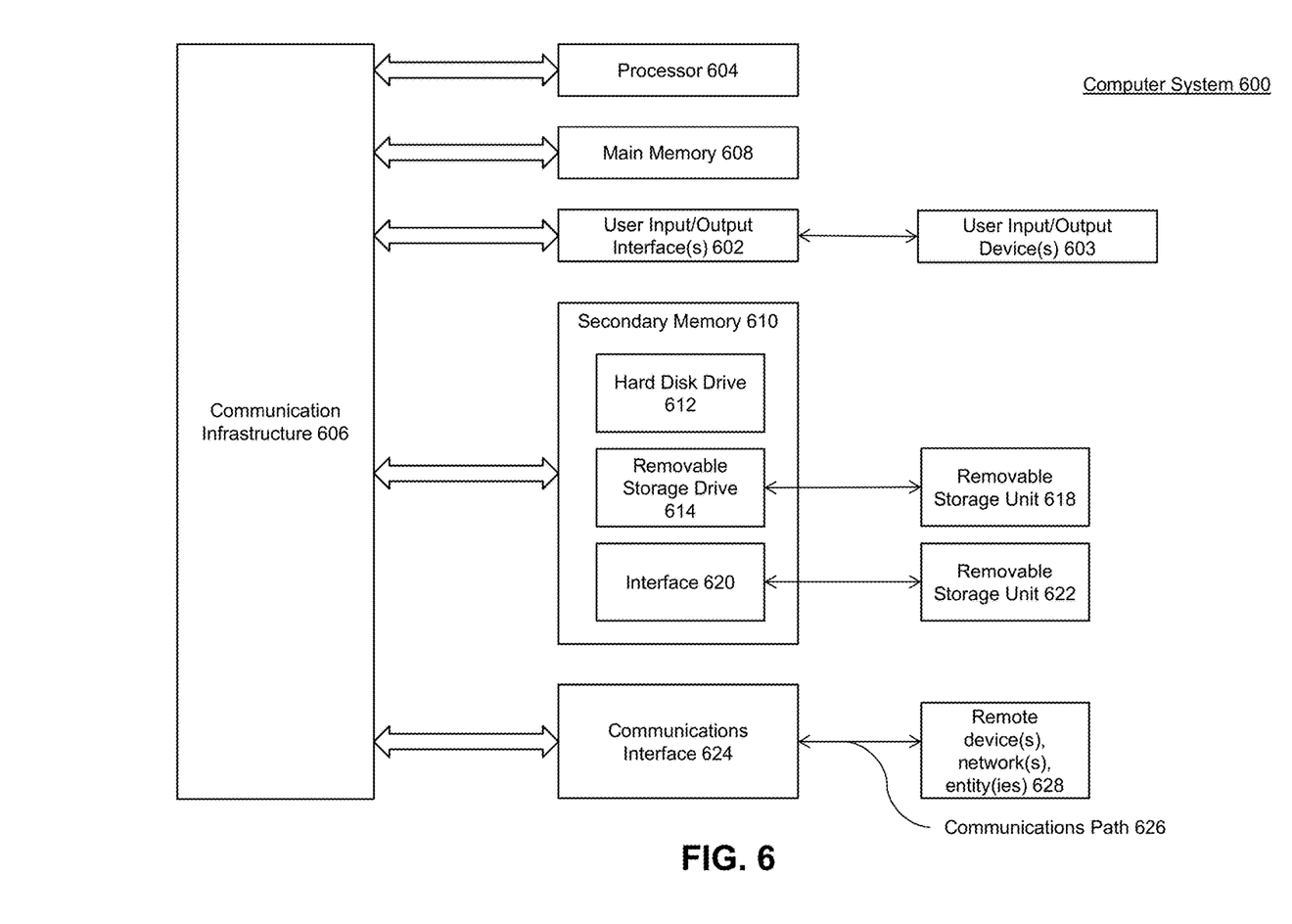
FIG. 6 is an example computer system useful for implementing various embodiments.

Each of these features is described in greater detail below with respect to the drawings FIG. 1 is a block diagram of a modularized application framework system 100, according to some embodiments. Modularized application framework system 100 may comprise modules 110A-110*n* (collectively referred to as 110), a framework 120, and a layout controller 130. One or more modules 110A-110*n* may interface with framework 120, and framework 120 may interface with layout controller 130. With reference to FIG. 6, modularized framework system 100 may be implemented using a computer system and/or one or more processors.

In an embodiment, modules 110 may be reusable software implementations. Modules 110 may follow a common structure and schema across the modules 110. In an embodiment, modules 110 may be applications or may be updates to an existing application. For example, a module may generate and/or display a list of a user's recent contacts; business objects such as documents or spreadsheet data; a calendar; a collection of news; stock prices; sales information including client, existing accounts, opportunities; an application finder; a colleague chat feature; creating sales orders; a combination thereof; and/or the like. A company may develop, or a third-party may develop, a module to suit the company's specific needs. In an embodiment, modules 110 may be collectively grouped into a catalogue from which framework 120 may select particular modules 110 to invoke.

Modules 110 are configured to pass metadata to framework 120. Modules 110 may also send and receive information to and from other modules 110. Metadata and information sharing are explained in more detail with reference to FIGS. 2 and 3, but metadata may refer to any data transmitted from a module 110. Within the modularized application framework system 100, each module may be logically uncoupled from other modules but may still communicate and share information using metadata. In an embodiment, this information is shared by using framework 120 as a medium. Although three modules 110A-110n are depicted in FIG. 1, system 100 may utilize any number of modules to provide different functionality. A more detailed description of the structure of module 110 and the metadata passed is provided with reference to FIG. 2.

In an embodiment, framework 120 is a core software, configured to execute modules based on received metadata from modules 110. Framework 120 may include a file containing a list of modules 110 and services. The list may contain uniform resource identifiers, which identify the modules 110 and services. In an embodiment, when framework 120 is first initiated, a list of modules 110 and/or services may be invoked.

Framework 120 may connect with one or more modules 110 and facilitate communication between modules 110. For example, module 110A may send core module data and/or program logic to framework 120. Framework 120 may then deliver the core module data and/or program logic to module 110B, which is subscribed to module 110A. A more detailed description of this module communication configuration is provided with reference to FIG. 2.

In an embodiment, framework 120 may allow a module to fail without interrupting service to other modules 110. For example, a user may be accessing and utilizing module 110A through framework 120. The user may then decide to also utilize module 110B. While interacting with both module 110A and module 110B, module 110B may cease functioning or may encounter a glitch. In this case, framework 120 may decide to terminate the function of module 110B while still allowing a user to interact with module 110A. This modularized approach allows decoupling that is more advantageous than a combined approach. If module 110B ceased to correctly function without the decoupling, a user would need to reset the entire software program.

Framework 120 does not depend on any particular module 110 in order to function. Thus, framework 120 will not crash or cease to function properly due to a missing module 110. In an embodiment, if module 110B ceases to function properly, by failing to provide desired information or by failing to execute program logic, framework 120 will still be able to interface with module 110A and/or any other modules.

In an embodiment, framework 120 may also execute rules, determining which users may view or invoke which modules 110. In an embodiment, these rules may be stored in the modules 110. When a user attempts to invoke a module 110 without permission, framework 120 may prevent the invocation of the module. The module will not pass to layout controller 130 for display and user access.

In an embodiment, framework 120 may also identify different dependencies and module loading. As explained with more detail in FIG. 2, framework 120 may use a startup file or configuration data associated with a module. While framework 120 is processing metadata received from a module 110, in an embodiment, framework 120 creates a copy of the data and/or program code to handle communication with other modules or with layout controller 130 during runtime.

In an embodiment, framework 120 interfaces with layout controller 130. Layout controller 130 determines the graphical user interface organization and presentation of the modules 110 for user interaction. Layout controller 130 determines how to display the one or more modules 110 that a user has invoked or that a system has determined to provide to a user as a default. In an embodiment, layout controller 130 receives information and/or configuration data from the one or more modules 110 invoked in order to determine the visual organization of the modules 110. In an embodiment, some modules 110 may not include a visual component and may instead be used by framework 120 for execution purposes. In this case, layout controller 130 will not generate a visual display for modules lacking visual components.

In an embodiment, layout controller 130 may determine the target environment and/or area to which the visual aspects of the modules 110 will be displayed. Layout controller 130 may determine characteristics of the target environment, such as platform, capabilities, and/or limitations and dynamically alter or adjust runtime paths. For example, a mobile context may be determined and a decision may be made regarding whether to present the visual display in a native or hybrid manner. Framework 120 may also make the determination based on information gathered from layout controller 130.

In an embodiment, layout controller 130 may generate a central layout, which reflects interface controls for framework 120. Within the central layout, layout controller 130 may generate graphical user interfaces for invoked modules 110. In an embodiment, the layout controller 130 defines multiple areas within the central layout, wherein each area is described by a semantic name. Modules 110 may produce metadata, such as configuration data, containing a semantic name to signal the area where the visual control for the module 110 should be placed. Additional metadata may define the ordering of the modules 110 in the area. By introducing a semantic name for any layout area, each module 110 may operate independently from the framework layout.

In an embodiment layout controller 130 may change the layout of modules 110 while the modules 110 are executing and/or already displayed. For example, in response to a user input, the organization of modules 110 may be adjusted. Modules 110 may be replaced with other modules 110. For example, module 110B may replace module 110A on the graphical user interface by occupying the same graphical user interface area as module 110A. The decoupling of the modules 110 from the framework 120 allows flexibility in changing or replacing the actual implementation or styling of the layout without affecting the operation the modules 110 themselves.

In an embodiment, layout controller 130 may generate an initial layout to display. This initial layout may be generated using metadata from framework 120. In an embodiment, a default set of modules 110 may be displayed.

An embodiment of a graphical user interface generated by layout controller 130 will be discussed in more detail with reference to FIGS. 4A-4D.

Figure 2:
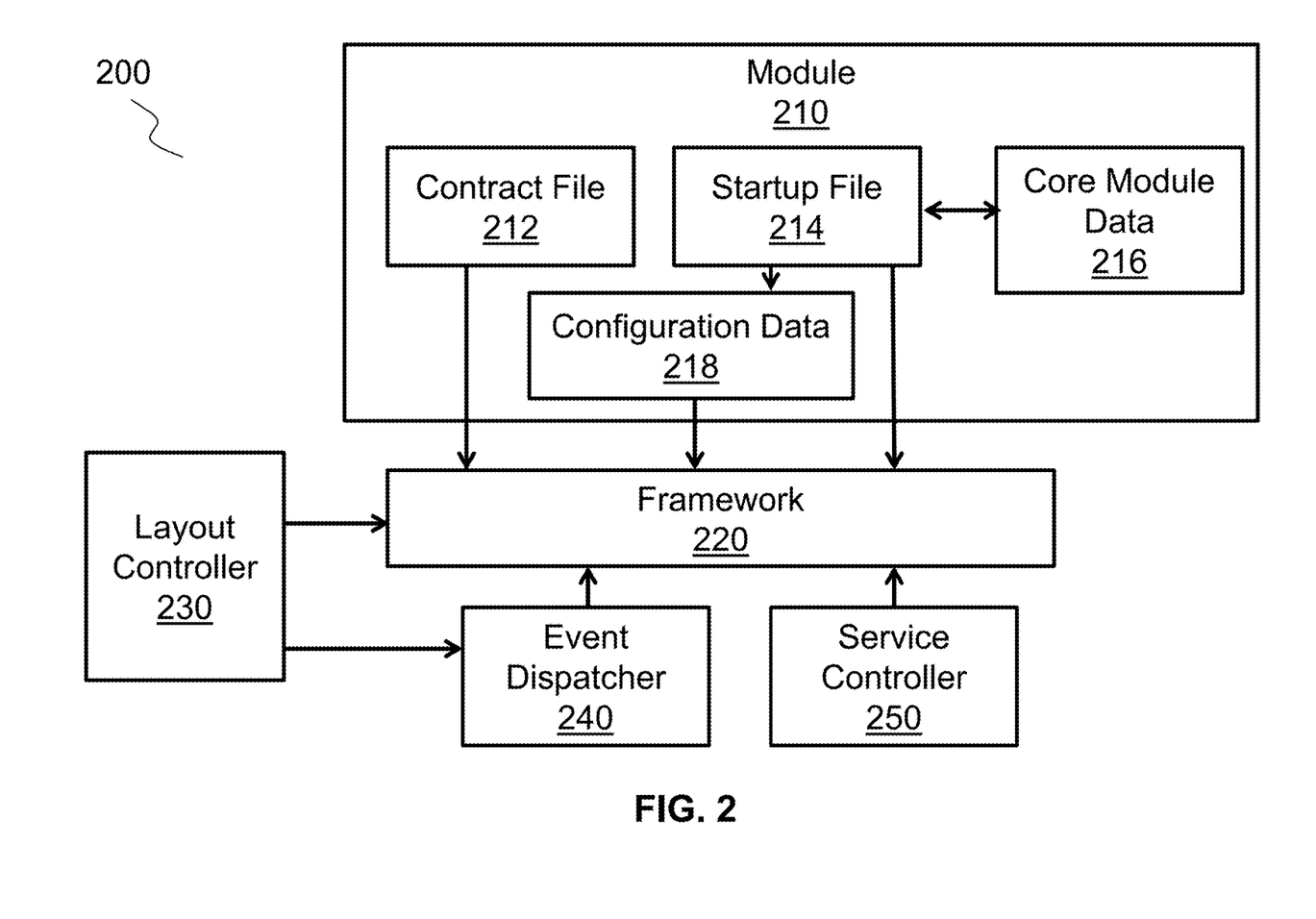
FIG. 2 is a block diagram of a modularized application framework system, according to some embodiments.

FIG. 2 is a block diagram of a modularized application framework system 200, according to some embodiments. Modularized application framework system 200 may comprise a module 210, a framework 220, a layout controller 230, an event dispatcher 240, and a service controller 250. Modularized application framework system 200 may be utilized to execute module 210 and to generate a graphical user interface, allowing a user to interact with module 210.

Module 210 may be communicatively coupled to framework 220. In an embodiment, module 210 comprises a contract file 212 and a startup file 214. Optionally, module 210 may also core module data 216 and configuration data 218.

Contract file 212 may be a data file used to transmit data objects. For example, contract file 212 may be of a JSON file format. In an embodiment, contract file 212 may be sent from module 210 to framework 220 to allow framework 220 to execute module 210 or facilitate the continued execution of module 210. Contract file 212 may contain information about module 210 configured in various data types. For example, contract file 212 may contain the following information: a unique identification which identifies the module 210; a target view property containing a semantic name of the layout area where module 210 should be displayed if module 210 provides a visual representation; a target view order property which indicates a position where the module 210 or a control mechanism related to module 210 should be displayed; a style property containing a path which points to a module folder holding a cascading style sheet (CSS) for the module that may be loaded when the module is initialized; a provides property detailing the events and services provided by module 210 to other modules; a subscribes property detailing the events and services to which the module 210 is currently subscribed; a template item type property which contains information used by framework 220 to generate a new instance of a module via an item type request; a template text key property containing the text key in a translatable resource file; a template item icon property specifying a path to a visual icon that may be used by layout controller 230 to visualize module 210; a combination thereof; and/or the like.

Startup file 214 may be a data file used to begin the execution of module 210 by framework 220. Startup file 214 may contain a declaration used to generate configuration data 218 and/or an execution to framework 220. In an embodiment, startup file 214 contains program data that may be executed by framework 220 which may invoke an event controller and/or layout controller 230. In an embodiment, framework 220 may read the startup file of multiple modules to determine which modules to invoke at startup.

Core module data 216 may be data associated with the function of module 210. Core module data 216 provides data that differentiates different modules. For example, core module data 216 may be business logic, user interface controls, business data, a combination thereof, and/or the like. Module 210 may represent a variety of software implementations and core module data 216 represents the data required to capture and/or execute the function associated with module 210. For example, if module 210 is configured to calculate sales revenue for a given amount of time for a given client, core module data 216 stores program code and/or logic required to execute the calculation. As explained with more detail in reference to service controller 250, in an embodiment, module 210 may receive information such as time and client sales by subscribing to a provided service and/or event of another module. In an embodiment, module 210 may also subscribe to framework 220.

Configuration data 218 may be metadata describing module 210, eventing, layouting, and services. Configuration data 218 contains metadata describing the capabilities of module 210. In an embodiment, configuration data 218 may be passed from module 210 to framework 220 to layout controller 230 to generate a graphical user interface with module 210. In an embodiment, configuration data 218 is used by framework 220 during a startup procedure to generate an initial view of one or more modules. The initial view describes which modules should be placed in which layout area on startup. Framework 220 may receive configuration data 218 from one or more modules 210 and utilize the information to generate the visual appearance of the initial view. In an embodiment, framework 220 may use configuration data 218 to generate a list of modules that are available for framework 220 to load.

In an embodiment, framework 220 may be core software used to execute module 210 as well as other modules. Because module 210 is not hard coded and there are no explicit dependencies, framework 220 may maintain stability even if some modules are not available. The metadata transferred between module 210 and framework 220 may be expressed, communicated, preserved, a combination thereof, and/or the like in numerous ways. For example, a separate data file may be maintained in framework 220 for each module. In an embodiment, framework 220 may utilize one or more data repositories to maintain aspects of the metadata with, for example, a set of identifiers, access mechanisms, permission models, a combination thereof, and/or the like.

In an embodiment, framework 220 may be communicatively coupled to layout controller 230, event dispatcher 240, and service controller 250. The description of layout controller 230 is further explained with reference to FIG. 1.

In an embodiment, event dispatcher 240 schedules and organizes events between modules as well as between a module and framework 220. Eventing refers to the transmission and reception of information required by either a module 210 or framework 220. In an embodiment, this information includes core modules data 216. If module 210 requires information from framework 220, module 210 may subscribe to framework 220. Similarly, module 210 may subscribe to another module as needed. If module 210 contains information relevant to another module, module 210 may provide this information when an event is raised. The information regarding which events are provided and subscribed by a module is defined in metadata used by event dispatcher 240. Eventing allows for modules to remain logically disconnected but still share information via framework 220.

In an embodiment, a first module provides core module data to a second module by utilizing framework 220. For example, core module data 216 may be passed from module 210 to framework 220. Framework 220 may then identify a second module that is subscribed to module 210. Framework 220 may recognize the subscription by reading a contract file associated with the second module that specifies the second module's subscriptions. Framework 220 may then provide the core module data to the second module. Because framework 220 is generate a cache and/or copy of the core module data from module 210, framework 220 is able to provide the data to the second module even if the first module encounters a failure. In an embodiment, framework 220 may request an updated version of the core module data 210. If framework 220 has determined that module 210 is unresponsive and/or cannot provide an updated version, framework 220 may generate a substitute version of the core module data. In an embodiment, framework 220 utilizes event dispatcher 240 to achieve this function and to avoid fault states.

Event dispatcher 240 ensures that a provider exists for subscribed events. In an embodiment, framework 220 may generate substitute core module data to avoid fault states.

Substitute core module data may comprise similar content as core module data 216 but may not contain the most up-to-date details. In an embodiment, substitute core module data may include an indicator that signals that core module data 216 was not available. Event dispatcher 240 may use substitute core module data to avoid fault scenarios when an event is raised but no provider exists.

In an embodiment, event dispatcher 240 may also be used to avoid fault scenarios when an event is raised but no subscriber exists. In an embodiment, event dispatcher 240 may interact with framework 220 to send a message to the provider module stating that the core module data has been received. This procedure may be invoked to prevent the provider module from entering an error state.

In an embodiment, provided events must be exposed explicitly by a module, allowing the module to control the amount of functionality that is exposed to other modules. In an embodiment, event dispatcher 240 schedules events while framework 220 calls a subscriber when an event is raised.

In an embodiment, service controller 250 schedules and organizes services between modules as well as between a module and framework 220. Servicing refers to abstracting certain aspects of module software to other modules that subscribe to that service. In an embodiment, a service mimics a module but is intended to be reused by other modules, allowing the other modules to invoke or execute bodies of code without requiring a complete implementation. A service may, for example, wrap, encapsulate, and/or abstract bodies of internal module functionality and/or third-party external functionality. By subscribing to another module's services, a module may be able to utilize the functions of the other module. Service controller 250 allows modules to interact functionally but still allows for decoupling of modules.

In an embodiment, module 210 may provide a service to another module. For example, module 210 may contain core module data 216 that includes program logic or program code for execution. Module 210 may load this core module data 216 into framework 220. Framework 220 may then mimic the features of or execute the program of module 210. When a second module that is subscribed to module 210 sends a request to framework 220 requesting the services of module 210, framework 220 may provide these services independent of module 210. In an embodiment, because framework 220 can provide the services, the second module will still receive the service even if module 210 becomes unresponsive or enters a failure state.

Figure 3:
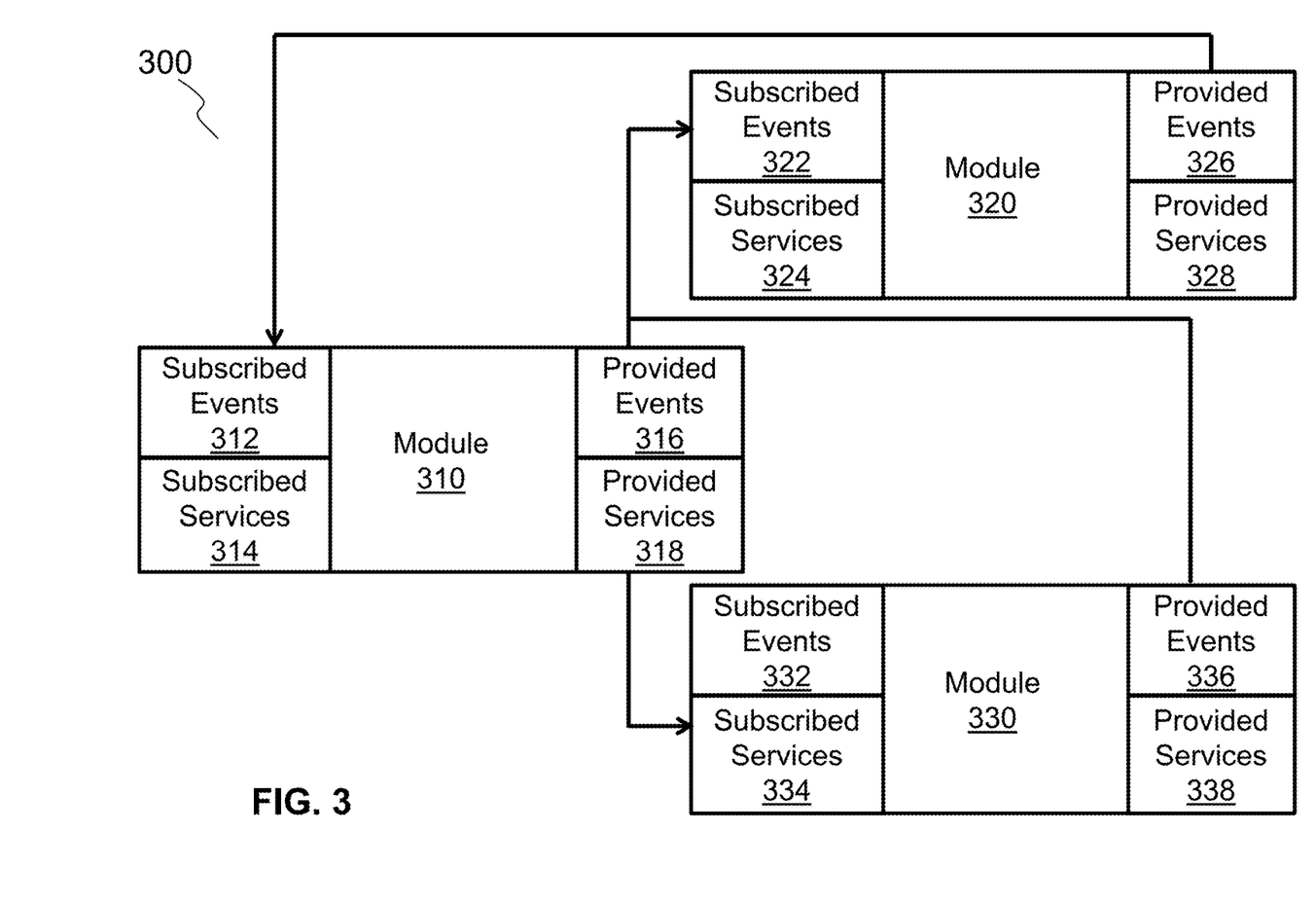
FIG. 3 is a block diagram of a module interaction within a framework system, according to some embodiments.

FIG. 3 is a block diagram of a module interaction within a framework system 300, according to some embodiments. Framework system 300 may comprise one or more modules 310, 320, and 330. While FIG. 3 depicts three modules, framework system 300 may employ less than or more than three modules. In an embodiment, a framework is used to connect the modules 310, 320, and 330 and is used as the medium of data and/or program logic/code delivery.

Framework system 300 depicts the data flow interaction between modules 310, 320, and 330 in an embodiment. With reference to module 310, module 310 includes a listing of subscribed events 312, subscribed services 314, provided events 316, and provided services 318. Module 320 and module 330 also include similar features. In an embodiment, module 310 is subscribed to one or more events provided by module 320 at 312. An event may be information transferred or received by a module, allowing the receiving module to process the information based on how the module is developed. Module 310 may also provide events at 316. In an embodiment, module 310 provides one or more vents to module 320, which subscribes to the event at 322. Module 330 also provides one or more events at 336 to module 320, which subscribes to the event at 322. Module 330 also subscribes to one or more services at 334. Module 310 may provide a service at 318 to module 330. Servicing refers to abstracting certain aspects of module software to other modules that subscribe to that service. By subscribing to another module's services, a module may be able to utilize the functions of the other module.

In an embodiment, a subscribing module may receive the same information from two other modules. For example, module 320 may subscribe to module 310 and 330 for the same information. In this case, if one module is unresponsive, the information may still be received from the other module.

In an embodiment, a framework separate from modules 310, 320, and 330 is used to generate the connections between the modules. This framework allows for the modules to be decoupled. The framework may also utilize an event dispatcher and/or a service controller to schedule the events and/or services. If a module fails or is no longer operational, the event dispatcher and/or the service controller may become a substitute and provide a subscribed event and/or service as needed by another module. Additionally, if an event and/or service is provided, the event dispatcher and/or the service controller may become a substitute subscriber in order to avoid any potential faults due to a missing subscriber.

Figure 4A:
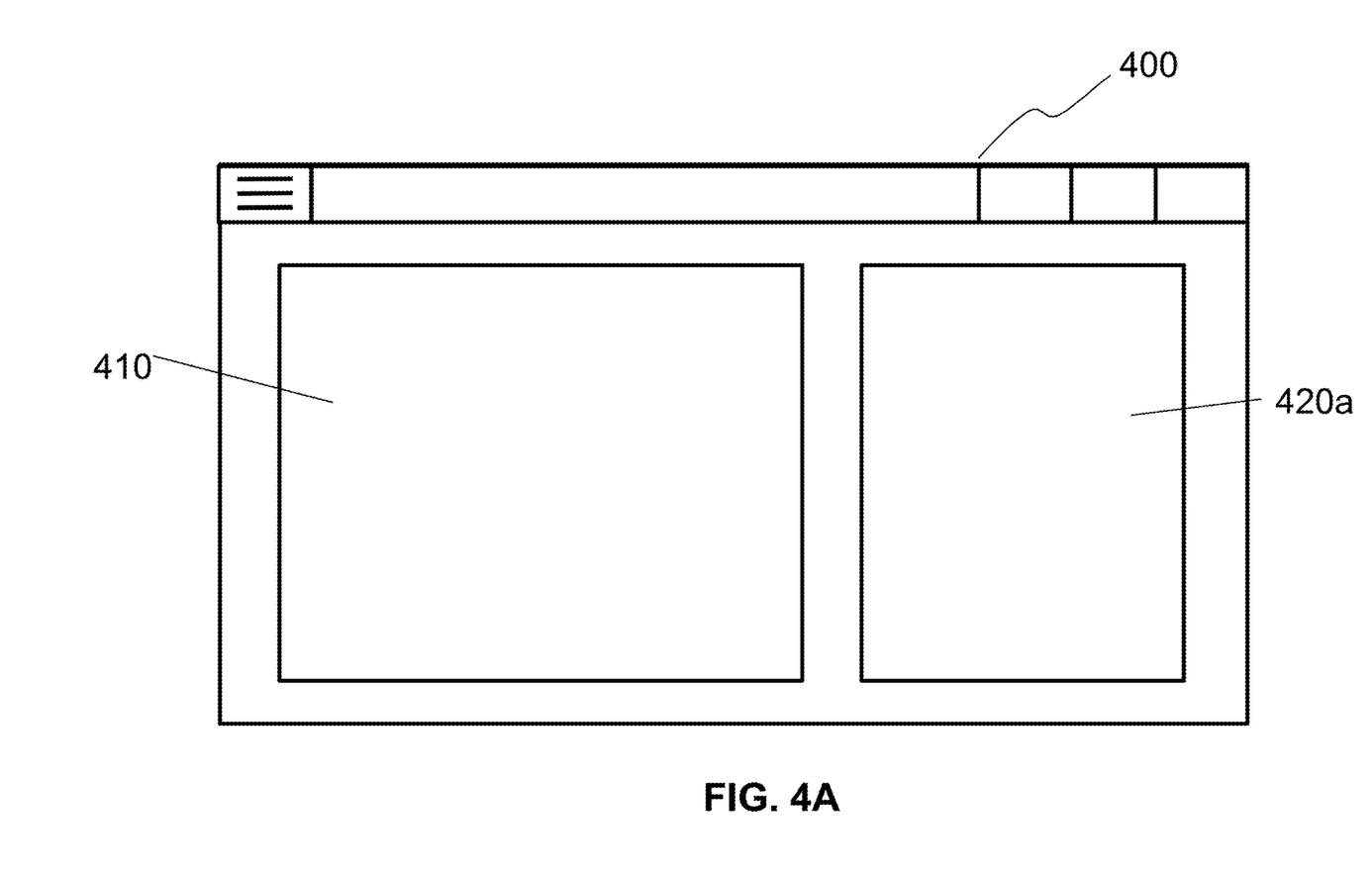
FIGS. 4A-4D are block diagrams of a graphical user interface, according to some embodiments.

FIG. 4A is a block diagram of a graphical user interface 400, according to some embodiments. Graphical user interface 400 may be displayed on a computer device, such as for example, a computer, laptop, television, phone, tablet, a combination thereof, and/or the like. Graphical user interface 400 provides a visual representation of underlying modules as well as an interface for users to interact with particular modules. In an embodiment, graphical user interface 400 may span one or more platforms and create a consistent look and feel. Users will be able to become familiar with the overall design, and the overall design can be enforced while still providing flexibility for creating appealing controls specific to modules.

In an embodiment, graphical user interface 400 may be generated from a layout controller of a modularized application framework. The layout controller may utilize configuration data from one or more modules in order to determine a display orientation.

In an embodiment, graphical user interface 400 may comprise a base application area 410 as well as a framework area 420a. Base application area 410 may be a launchpad for existing applications or other software that executes independently from a framework. In an embodiment, base application area 410 may not exist and graphical user interface 400 may only display framework area 420a. In an embodiment, base application area 410 and/or framework area 420a are scalable in visual size, adjustable in terms of location as displayed, minimizable, capable of being displayed across different platforms, a combination thereof, and/or the like.

In an embodiment, framework area 420a displays visual representations of one or more modules. Framework area 420a allows a user to interact with the one or more modules. Users may request specific modules to be populated in framework area 420a, and/or framework area 420a may be automatically populated based on configuration data and startup files residing within the modules. In an embodiment, a user may utilize base application area 410 to navigate software or an Internet browse and use framework area 420a to access relevant modules. In an embodiment, if a module displayed in framework area 420a encounters an error, the visual representation of the module may be removed from the framework area 420a. An underlying framework may terminate the execution of the module. If the module is terminated, however, users will still be able to interact with other invoked modules due to the stability of the underlying framework and framework area 420a.

Figure 4B:
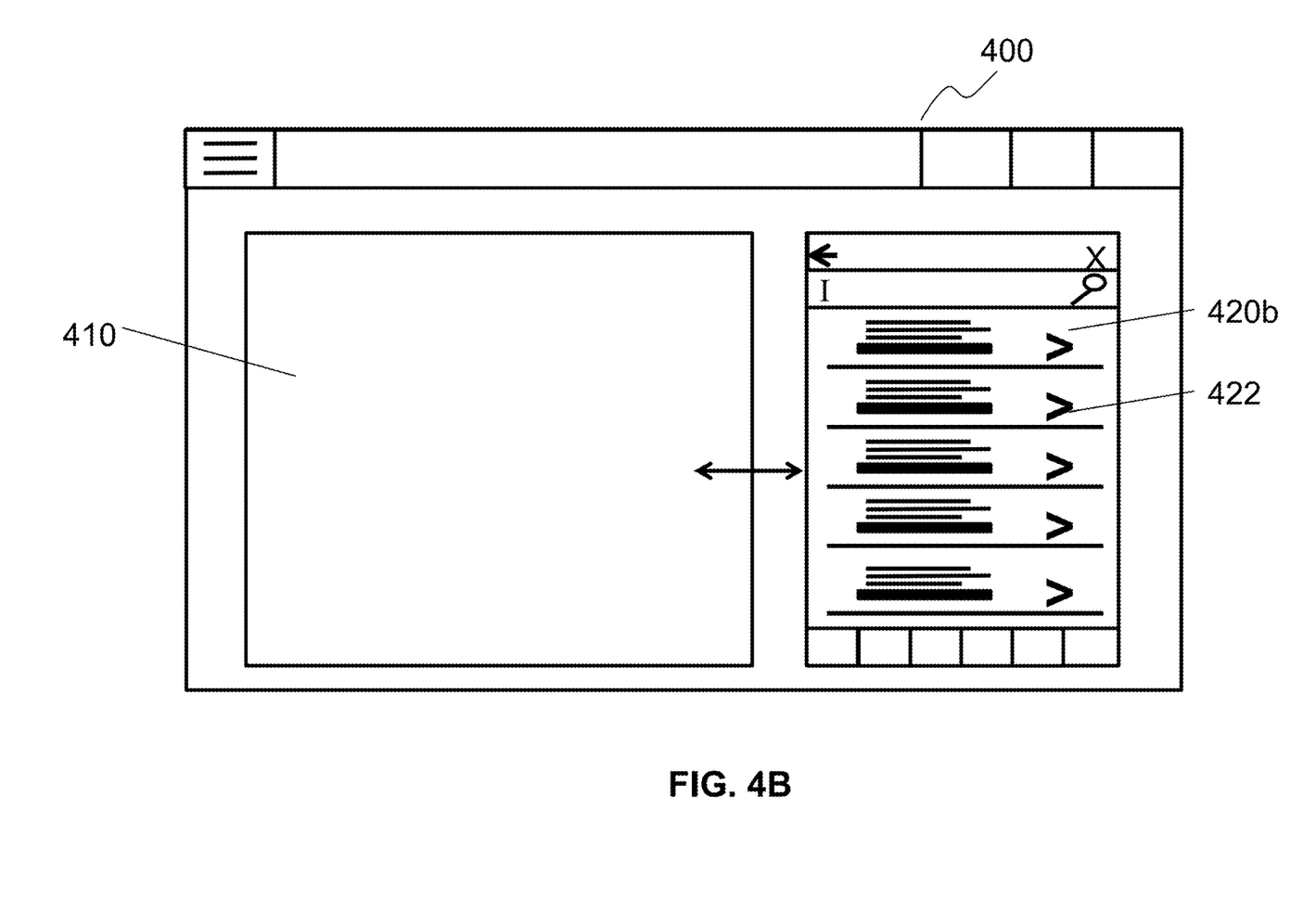

FIG. 4B is a block diagram of a graphical user interface 400, according to some embodiments. In an embodiment, base application area 410 may still allow a user to utilize software outside of the module framework. Framework area 420b is now populated with a visual representation of a module 422. In an embodiment, users may interact with module 422 displayed in 420b to obtain information or provide commands to the underlying module. In an embodiment, an underlying framework allows data to be transferred from base application area 410 to the module 422 displayed in 420b. The framework may manage the underlying metadata to, for example, populate information fields of the invoked module 422. In an embodiment, a user may drag-and-drop data from base application into module 422 displayed in 420b and vice versa.

For example, a user may be attempting to generate a sales order using base application area 410. The user may access customer, product, and/or shipping address information using module 422 as displayed in framework area 420b. The user may then drag-and-drop this information into base application area 410. The underlying framework will recognize the metadata associated with the module information and automatically populate those fields in the base application area 410. This feature allows users to more quickly generate a sales order while still maintaining independent, decoupled modules. In an embodiment, users may also drag-and-drop information between modules as depicted in FIG. 4C.

Figure 4C:
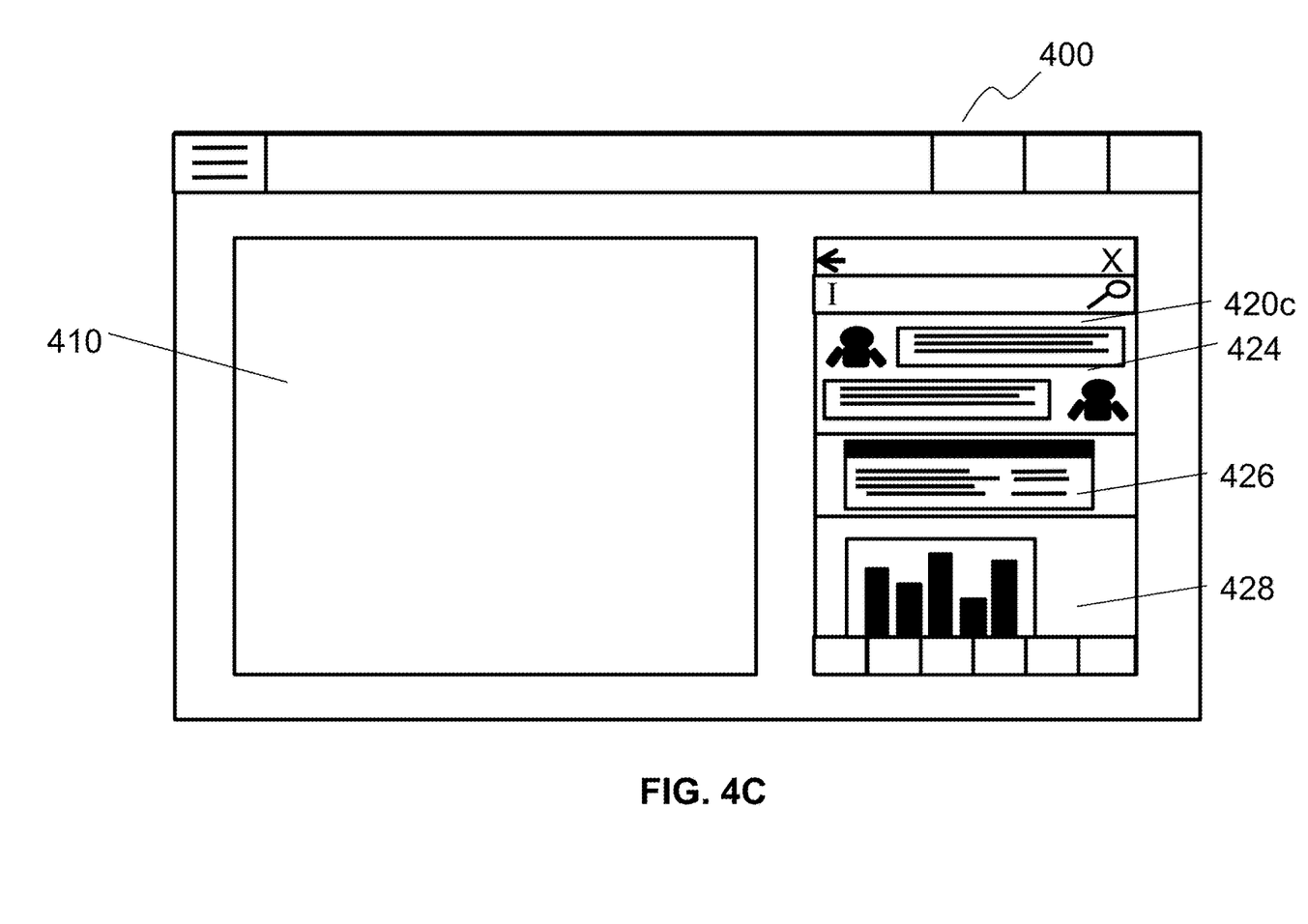

FIG. 4C is a block diagram of a graphical user interface 400, according to some embodiments. In an embodiment, base application area 410 may still allow a user to utilize software outside of the module framework. Framework area 420c is now populated with a visual representation of modules 424, 426, and 428. In an embodiment, modules 424, 426, and 428 may be represented as tiles, groups of tiles, links, other references, a combination thereof, and/or the like. Modules 424, 426, and 428 may perform different functions from module 422. Framework area 420c still retains all of the features described with respect to framework area 420b. Further, data may be transferred among the modules either automatically via the underlying framework or via user input. Allowing multiple views of modules will allow a user to access a larger amount of information. Further, the visual placement of modules 424, 426, and 428 is customizable. Although FIG. 4C depicts three modules, the number of modules displayed in framework area 420c may vary.

Figure 4D:
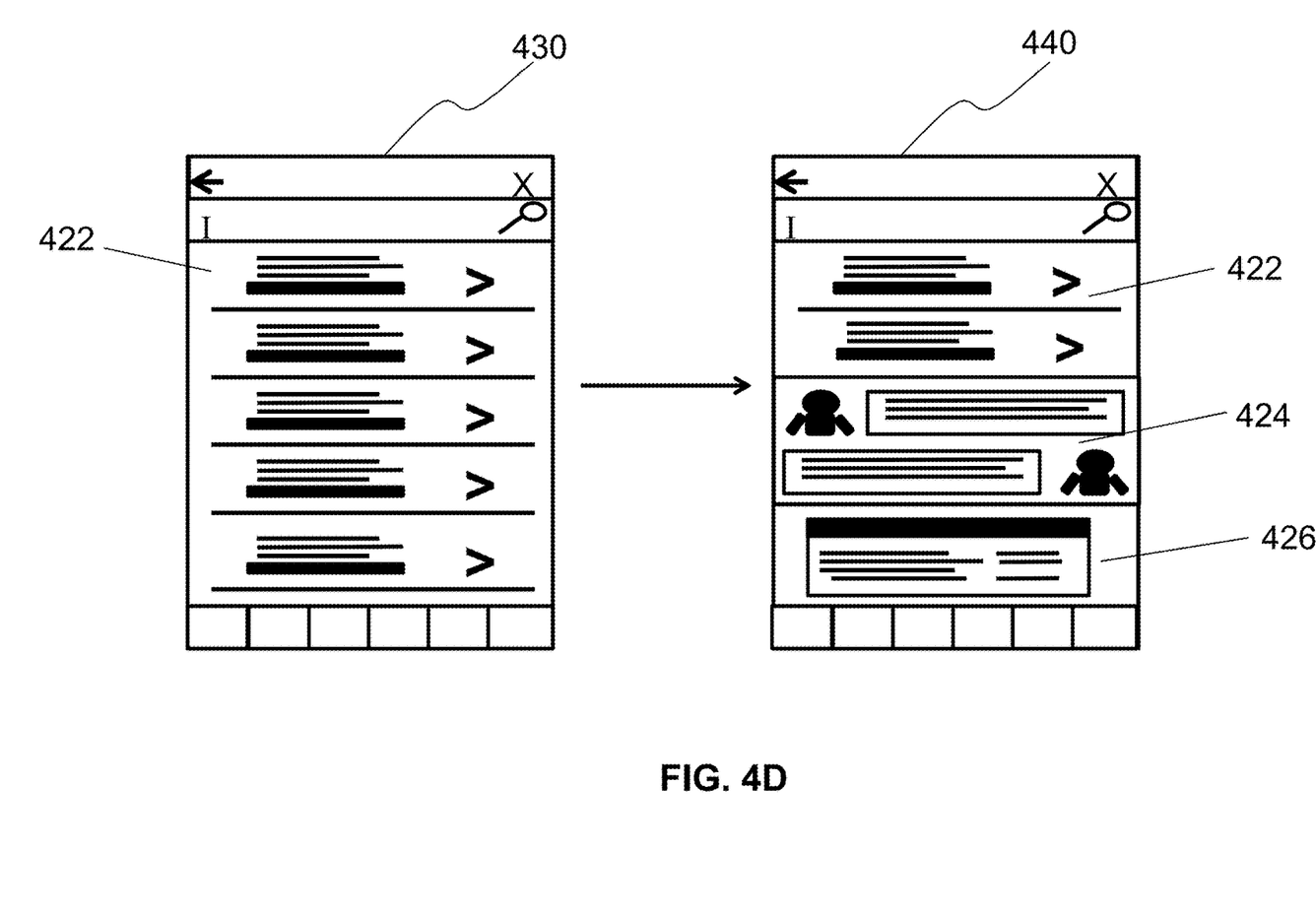

FIG. 4D is a block diagram of graphical user interfaces 430 and 440, according to some embodiments. FIG. 4D shows a framework area as it transitions between two graphical user interfaces 430 and 440. Graphical user interface 430 may first display a visual representation of module 422. A user may then invoke other modules 424 and 426 to also be displayed. The underlying framework may utilize startup files and configuration files in order to generate a display for modules 424 and 426. In an embodiment, the framework may generate the graphical user interface 440.

In an embodiment, the framework may maintain the display of module 422 while adding the displays for modules 424 and 426. This organization allows a user to continue to utilize module 422 while invoking new modules 424 and 426. Further, the modularized aspect of the modules grants the user the capability to utilize module 422 without needing to invoke modules 424 and 426.

Figure 5:
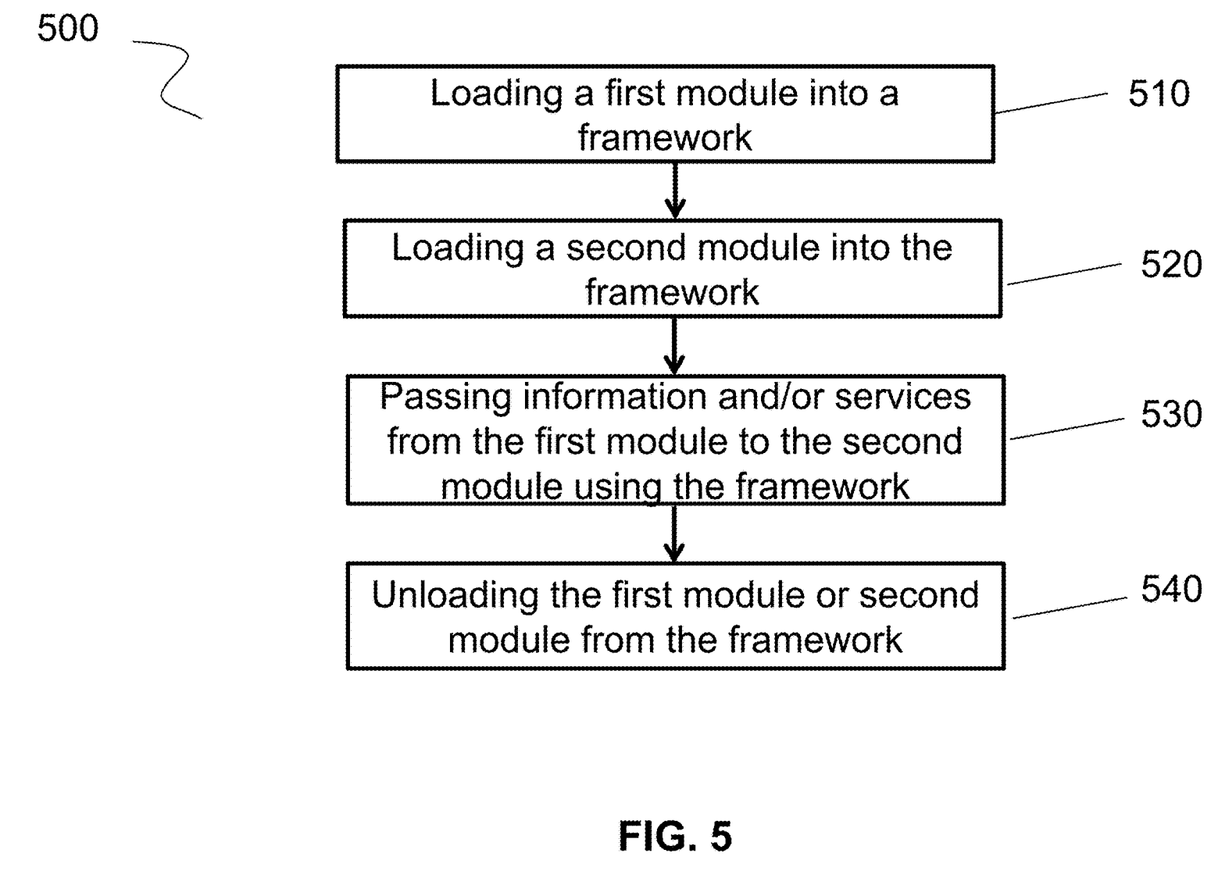
FIG. 5 is a flowchart illustrating a method for operating a modularized application framework, according to some embodiments.

FIG. 5 is a flowchart illustrating a method for operating a modularized application framework 500, according to some embodiments. Method 500 may be employed to utilize a framework with decoupled modules. Decoupled modules allow for faster development of updates as well as the deployment of new and updated modules without interfering with existing applications. Method 500 provides an embodiment of how decoupled modules may be invoked by a framework.

At 510, a first module may be loaded into a framework. In an embodiment, the framework may automatically invoke the first module based on startup information stored within the first module. For example, the module may store a startup file or configuration data that, when read by a framework, signals that the first module should be loaded. In an embodiment, the first module is selected by a user who is interacting with the framework. For a framework to load a first module, the framework interacts with core module data stored in the module which distinguishes the first module from other modules.

At 520, a second module may be loaded into the framework. Similar to 510, the module may be loaded when the framework interacts with the core module data in the second module. The second module may also be automatically invoked if the second module's startup file or configuration data signifies that it should be invoked. In an embodiment, a user may select the second module to load into the framework. In an embodiment, the first and second modules may be invoked in different ways.

At 530, information and/or services may be passed from the first module to the second module using the framework. The module may utilize a subscriber/provider model in order to receive and send information. For example, if the second module requires information or functionality from the first module, the second module may subscribe to the events and services provided by the first module. In an embodiment, the second module may pass information and/or services to the first module, wherein the second module becomes the provider and the first module becomes the subscriber.

Using the framework at 530 is what allows the decoupling of the modules. Having a stable framework that can transfer information between the first and second modules allows the first and second modules to remain logically decoupled while still being able to communicate.

At 540, the first or second module is unloaded from the framework. A user may specify which module to unload or a module may become unloaded due to an error. In an embodiment, if the first module is unloaded, the second module will still be able to operate due to the stability of the framework. Users will still be able to interact with the second module despite the absence of the first module. In an embodiment where the second module is subscribed to the first module, the framework may provide substitute information or services in order to maintain the functionality of the second module. Thus, the framework as well as the second module will remain operational even if the first module is unloaded.

Various embodiments can be implemented, for example, using one or more computer systems, such as computer system 600 shown in FIG. 6. Computer system 600 can be used, for example, to implement method 500 of FIG. 5. For example, computer system 600 can load a first and second module into a frame as well as utilize the framework to pass information or services from the first module to the second module, according to some embodiments. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments using data processing devices, computer systems and/or computer architectures other than that shown in FIG. 6. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of disclosed inventions should not be limited by any of the above-described exemplary embodiments, but should be defined only in accordance with the following claims and their equivalents.

What is claimed is:

1. A computer-implemented method, comprising:
receiving, at a framework, first core module data from a first application module;
receiving, at the framework, a contract file from a second application module in response to an interaction invoking the second application module, wherein the contract file specifies that the second application module is subscribed to the first application module;
receiving, at the framework, a first request from the second application module for the first core module data;
in response to receiving the first request from the second application module for the first core module data transmitting, from the framework, the first core module data from the framework to the second application module;
receiving, at the framework, a second request from the second application module for second core module data associated with the first application module;
determining, at the framework, that the first application module is unresponsive;
in response to the determining, generating, at the framework, substitute core module data; and
transmitting, from the framework, the substitute core module data to the second application module as the second core module data.

2. The computer-implemented method of claim 1, further comprising obtaining startup information from a plurality of modules including the first and second application modules, wherein the plurality of modules are logically independent from each other and wherein the startup information relates to execution of the plurality of modules.

3. The computer-implemented method of claim 1, wherein the subscription of the second application module to the first application module further indicates that the second application module is configured to receive a service from the first application module.

4. The computer-implemented method of claim 1, further comprising:
receiving, at the framework, program logic from the first application module;
in response to a request from the second application module for data processing according to the program logic associated with the first application module, providing data processing according to the program logic from the framework to the second application module.

5. The computer-implemented method of claim 1, further comprising:
receiving, at the framework, configuration data from the first application module, wherein the configuration data comprises a target area described by a semantic name; and
outputting, from the framework, visual information related to the first core module data to the target area.

6. The computer-implemented method of claim 1, wherein generating the substitute core module data further comprises:
packaging the first core module data with data indicating that the first application module is unresponsive.

7. The computer-implemented method of claim 1, further comprising:
detecting that the second application module is unable to receive the first core module data provided by the framework; and
sending to the first application module a core module data reception indicator to prevent a first application module error state.

8. A system, comprising:
a memory; and
one or more processors coupled to the memory and configured to:
instantiate a plurality of modules based on module information stored in the memory;
instantiate a framework, wherein the framework is configured to:
receive first core module data from a first application module of the plurality of modules;
receive a contract file from the second application module in response to an interaction invoking the second application module, wherein the contract file specifies that the second application module is subscribed to the first application module;
receive a first request from the second application module for the first core module data:
in response to receiving the first request from the second application module for the first core module data, transmitting the first core module data to the second application module;
receive a second request from the second application module for second core module data associated with the first application module;
determine that the first application module is unresponsive;
in response to the determining, generate substitute core module data; and
transmit the substitute core module data to the second application module as the second core module data.

9. The system of claim 8, wherein the framework is further configured to obtain startup information from a plurality of modules including the first and second application modules, wherein the plurality of modules are logically independent from each other and wherein the startup information relates to execution of the plurality of modules.

10. The system of claim 8, wherein the subscription of the second application module to the first application module further indicates that the second application module is configured to receive a service from the first application module.

11. The system of claim 8, wherein the framework is configured to:
receive program logic from the first application module;
in response to a request from the second application module for data processing according to the program logic associated with the first application module, provide data processing according to the program logic from the framework to the second application module.

12. The system of claim 8, wherein the framework is configured to:
receive configuration data from the first application module, wherein the configuration data comprises a target area described by a semantic name; and
output visual information related to the first core module data to the target area.

13. The system of claim 8, wherein to generate the substitute core module data the framework is further configured to:
package the first core module data with data indicating that the first application module is unresponsive.

14. The system of claim 8, wherein the framework is further configured to:
detect that the second application module is unable to receive the first core module data provided by the framework; and send to the first application module a core module data reception indicator to prevent a first application module error state.

15. A tangible, non-transitory computer-readable device having instructions stored thereon that, when executed by at least one computing device, cause the at least one computing device to perform operations comprising:
receiving, at a framework, first core module data from a first application module;
receiving, at the framework, a contract file from a second application module in response to an interaction invoking the second application module, wherein the contract file specifies that the second application module is subscribed to the first application module;
receiving, at the framework, a first request from the second application module for the first core module data;
in response to receiving the first request from the second application module for the first core module data, transmitting, from the framework, the first core module data from the framework to the second application module;
receiving, at the framework, a second request from the second application module for second core module data associated with the first application module;
determining, at the framework, that the first application module is unresponsive;
in response to the determining, generating, at the framework, substitute core module data; and
transmitting from the framework, the substitute core module data to the second application module as the second core module data.

16. The computer-readable device of claim 15, the operations further comprising obtaining startup information from a plurality of modules including the first and second application modules, wherein the plurality of modules are logically independent from each other and wherein the startup information relates to execution of the plurality of modules.

17. The computer-readable device of claim 15, the operations further comprising:
receiving, at the framework, program logic from the first application module;
in response to a request from the second application module for data processing according to the program logic associated with the first application module, providing data processing according to the program logic from the framework to the second application module.

18. The computer-readable device of claim 15, the operations further comprising:
receiving, at the framework, configuration data from the first application module, wherein the configuration data comprises a target area described by a semantic name; and
outputting, from the framework, visual information related to the first core module data to the target area.

19. The computer-readable device of claim 15, wherein to generate the substitute core module data, the operations further comprise:
packaging the first core module data with data indicating that the first application module is unresponsive.

20. The computer-readable device of claim 15, the operations further comprising:
detecting that the second application module is unable to receive the first core module data provided by the framework; and
sending to the first application module a core module data reception indicator to prevent a first application module error state.

* * * * *